United States Patent [19]

Mitchell

[11] Patent Number: 4,894,614
[45] Date of Patent: Jan. 16, 1990

[54] APPARATUS FOR MEASURING THE CENTER-TO-CENTER DISTANCE BETWEEN POINT WIRES OF PRINT SOLENOIDS

[75] Inventor: John G. Mitchell, Trumansburg, N.Y.

[73] Assignee: NCR Corporation, Dayton, Ohio

[21] Appl. No.: 321,027

[22] Filed: Mar. 9, 1989

Related U.S. Application Data

[62] Division of Ser. No. 945,995, Dec. 24, 1986.

[51] Int. Cl.$^4$ ............................ G01B 7/14; B41J 9/38; B41J 11/18
[52] U.S. Cl. .................................... 324/208; 400/53; 400/74; 400/704; 324/226
[58] Field of Search ................ 324/207, 208, 226–228, 324/233, 236, 234, 243, 260–262; 400/55, 74, 704; 361/152, 159

[56] References Cited

U.S. PATENT DOCUMENTS

| | | | |
|---|---|---|---|
| 3,740,615 | 6/1973 | Vigini | 317/148.5 R |
| 4,100,480 | 7/1978 | Lytle et al. | 323/51 |
| 4,218,150 | 8/1980 | Swain | 400/124 |
| 4,293,888 | 10/1981 | McCarty | 361/152 |
| 4,353,656 | 10/1982 | Sohl et al. | 400/157.3 |
| 4,480,934 | 11/1984 | Herman | 400/124 |
| 4,523,867 | 6/1985 | Berrey et al. | 400/124 |
| 4,538,930 | 9/1985 | Dunfield | 400/144.2 |
| 4,547,087 | 10/1985 | Heider et al. | 400/144.2 |

OTHER PUBLICATIONS

"Matrix Printer Wire Driver Tester", Research Disclosure, May 1984, No. 241, pp. 208.
"Print Head Drive Protection Circuit", IBM/TDB, vol. 28, No. 6, Nov. 1985, pp. 2374–2375.

*Primary Examiner*—Reinhard J. Eisenzopf
*Assistant Examiner*—Warren S. Edmonds
*Attorney, Agent, or Firm*—Wilbert Hawk Jr.; Albert L. Sessler Jr.; Elmer Wargo

[57] ABSTRACT

A center-to-center distance measuring device for measuring the exact spacing between print solenoids. The device uses a test block having a top surface and a bottom surface which are parallel. The top surface has first and second bevel surfaces which are parallel to each other, extend from the top surface towards the bottom surface and are spaced apart at a predetermined distance. The print solenoids are positioned perpendicularly to the top surface of the test block such that the print wires of the print solenoids impact against the test block when energized. The displacement of the print wires from the solenoids is used to determine the center-to-center spacing as the print wires impact against the bevel surfaces as the test block is moved.

3 Claims, 8 Drawing Sheets

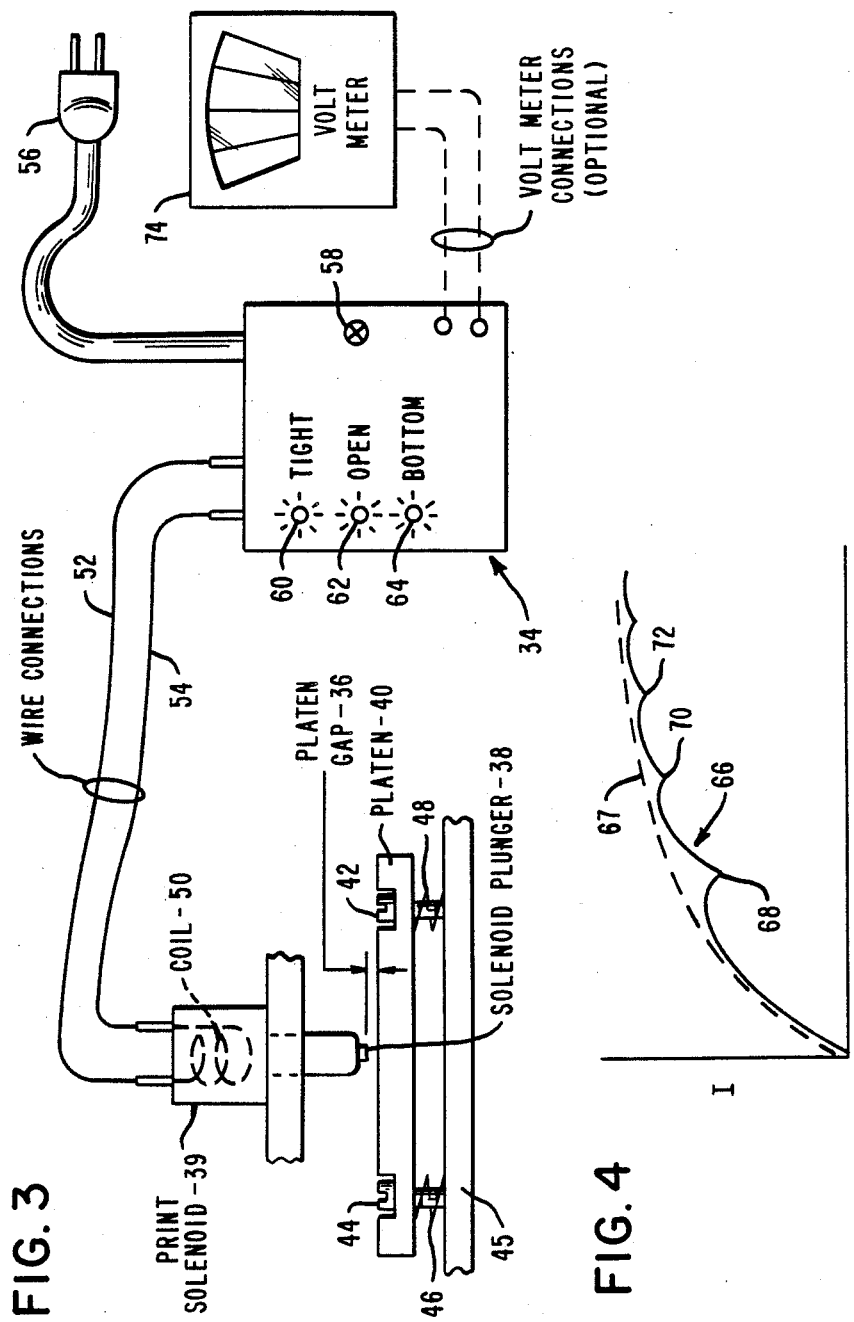

APPARATUS FOR MEASURING THE CENTER-TO-CENTER DISTANCE BETWEEN POINT WIRES OF PRINT SOLENOIDS

This application is a division of application Ser. No. 945,995 filed Dec. 24, 1986.

BACKGROUND OF THE INVENTION

This invention relates to a method and apparatus for measuring the displacement of a moveable member of an electromagnetic device wherein the measuring is effected by utilizing the perturbations which occur in the energizing current of the device when the moveable member contacts a second member.

One of the present methods of determining or setting "gaps" is through the use of mechanics' feeler gages. While feeler gages are useful for many applications, they have certain disadvantages. For example, the accuracy of this method depends, to a large extent, upon the skill of the person doing the measuring. Secondly, when the materials located on both sides of the gap are yieldable, it is difficult to ascertain the width of the gap with feeler gages.

Another problem with prior-art methods of determining or setting gap widths in that the gap must be accessible, generally, in order for the feeler gages mentioned to be utilized.

SUMMARY OF THE INVENTION

In contrast with the prior-art techniques mentioned, the present method and apparatus may be used by testing personnel who do not need special training or a special "feel" for using feeler gages accurately.

Another advantage of this invention is that it may be used to ascertain or to set gaps which are inaccessible to humans.

In one aspect this invention entails a method of measuring the displacement of a moveable member of any electromagnetic device during energization of its associated energizing coil comprising the steps: (a) detecting perturbations which occur in the energizing current of said electromagnetic device when said moveable member contacts a second member; and (b) using a preselected one of said perturbations as being indicative of the displacement of said moveable member.

In another aspect, this invention relates to an apparatus which includes: an electromagnetic device having a moveable member and an associated operating coil; and a circuit for measuring the displacement of said moveable member when said operating coil is energized; said circuit being coupled with said operating coil when said operating coil is energized; said operating coil having perturbations in its energizing current when said moveable member contacts a second member during a measuring process; said circuit comprising: detector means for detecting said perturbations in said energizing current; generating means for generating a first derivative signal of said energizing current; said first derivative signal having indicator portions corresponding to said perturbations; selecting means for selecting one of said indicator portions of said first derivative signal as being indicative of said measuring process; and converting means for converting said one of said indicator portions into a value corresponding to said displacement.

The advantages mentioned and others will become more readily understood in connection with the following specification, claims, and drawing.

BRIEF DESCRIPTION OF THE DRAWING

FIG. 3 is a diagrammatic view, partly in cross section, showing a typical application of a preferred embodiment of this invention;

FIG. 4 shows certain waveforms used in explaining the operation of this invention;

DETAILED DESCRIPTION OF THE INVENTION

Figure 1:
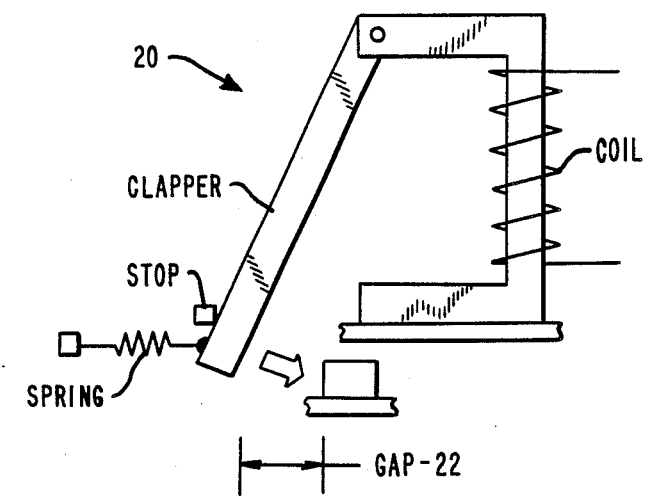
FIG. 1 is a diagrammatic showing of a prior art, electromechanical device whose gap may be set using this invention.
Figure 2:
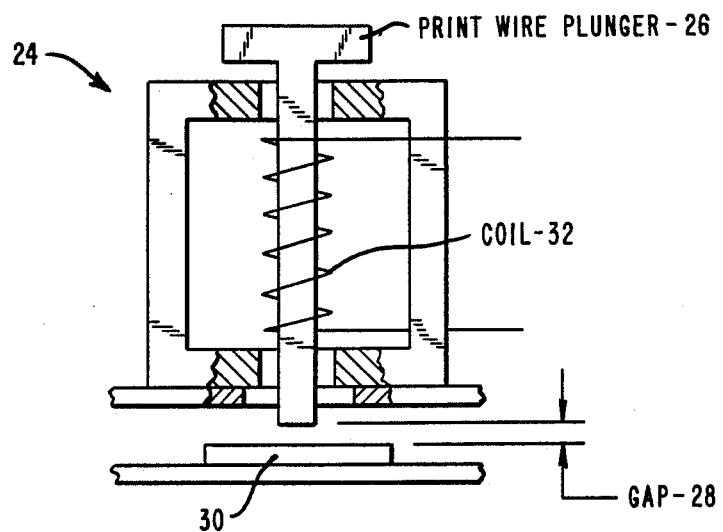
FIG. 2 is a diagrammatic showing of a second, prior-art, electromechanical device whose gap may be set using this invention.

FIGS. 1 and 2 show two different prior-art electromechanical devices whose gaps may be set using the method and apparatus of this invention. In this regard, FIG. 1 shows a clapper-type solenoid 20 having a gap 22 which is to be set to a predetermined width or distance. Similarly, FIG. 2 shows a wire matrix actuator or print solenoid 24 whose print wire plunger 26 is to be set at a predetermined distance or gap 28 from the associated platen 30. Return springs and internal stops similar in concept to those shown in FIG. 1, but not shown in FIG. 2, are used to hold the print wire plunger 26 in the position shown in FIG. 2. When the energizing coil 32 is energized, the print wire plunger 26 impacts against a sheet of paper and ribbon (not shown) on the platen 30 to effect printing. In order to provide for accurate, controlled printing, it is necessary that the gap 28 be accurately controlled; this is especially true when several print solenoids 24 are grouped together to produce a dot matrix type character or a line of printing. The gaps 22 and 28 shown in FIGS. 1 and 2 are often set with feeler gages as described earlier herein.

FIG. 3 is a diagrammatic view showing how the apparatus or circuit 34 of this invention may be used to set the platen gap 36 between the solenoid plunger 38 of a print solenoid 39 and the platen 40 in a wire matrix printer environment. For ease of illustration, the platen gap 36 is adjusted by moving the platen 40 towards or away from the solenoid plunger 38 by adjustment screws 42 and 44. The platen 40 is resiliently biased away from the base 45 by springs 46 and 48.

In order to use the circuit 34 of this invention, the circuit 34 is placed generally in series with the energizing coil 50 of the print solenoid 39 by wire connections 52 and 54 as will be described hereinafter. The circuit 34 is connected to a source of electric power by a plug 56, and a switch 58 (shown schematically in FIG. 3) is closed to energize the coil 50 to move the solenoid plunger 38 towards the platen 40. In the embodiment described, the circuit 34 has visual indicators to indicate the status of the gap 36 being measured. For example, indicator 60, if glowing, indicates a tight gap with respect to a "go" or "no go" situation, while indicator 62, if glowing, indicates an open or loose gap. When both indicators 60 and 62 are glowing, they indicated a satisfactory gap adjustment. When the "bottom" indicator 64 is glowing during a test, it indicates that the solenoid plunger 38 has "bottomed out". As used herein, "bottoming out" means that the solenoid plunger 38 has moved out beyond its normal range and has hit an internal stop within the print solenoid itself. It is useful for an operator to know that bottoming out has occurred so as to not mistake it for an "open" situation. Bottoming can also provide a false tighter gap indication than is actually happening.

Before describing the circuit 34, it is useful to describe how the circuit 34 (FIG. 3) operates in general. As stated earlier herein, the measuring of the displacement of a moveable member (like solenoid plunger 38) of an electromagnetic device (like print solenoid 39) is effected by utilizing the perturbations which occur in the energizing current of the device when the associated moveable member contacts a second member (like platen 40). In this regard, the curve 66, shown in solid line in FIG. 4, represents the perturbations like 68, 70, and 72, for example, which occur when the solenoid plunger 38 contacts the platen 40 during the measuring process in the example being described. While there may be situations in which the second or third, etc. perturbations 70 and 72 may be useful, it is the first perturbation 68 which is utilized as being indicative of the displacement of the solenoid plunger 38 in the apparatus or circuit 34. Perturbation 70 and 72 result from plunger bounce, and therefore, they could be used as a measure of the distance over which the plunger 38 travels during bouncing but not as a measure of static gap. The dashed line 67, shown in FIG. 4 represents a typical logarithmic curve for the change in current (I) with respect to time (T) for an electromagnetic device (without any moving parts) when it is energized from a source of constant voltage. Notice that there are no perturbations in the curve represented by dashed line 67.

Figure 5A:
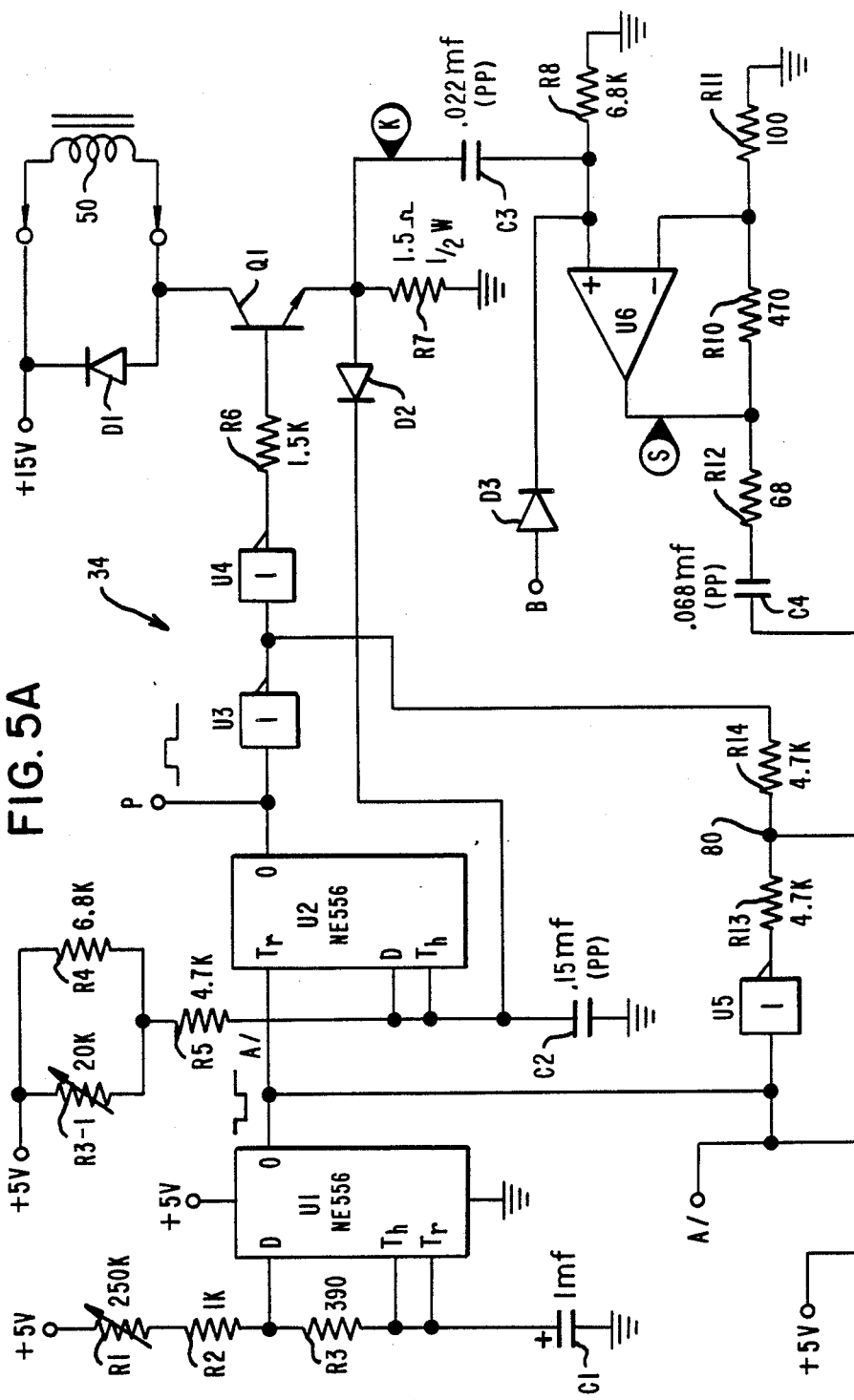
FIGS. 5A and 5B, taken together, show the details of the apparatus or circuit shown in FIG. 3.
Figure 5B:
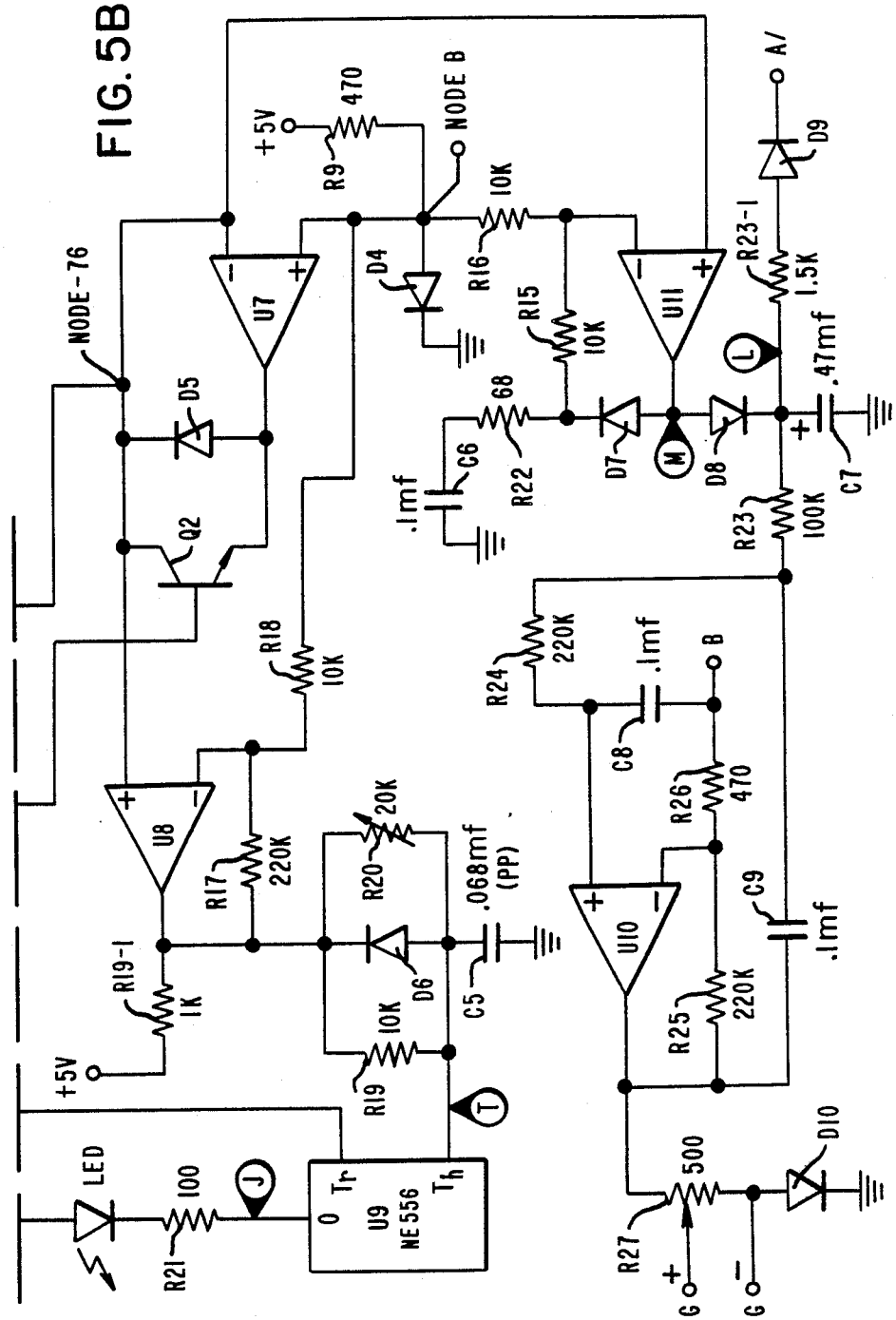
Figure 6:
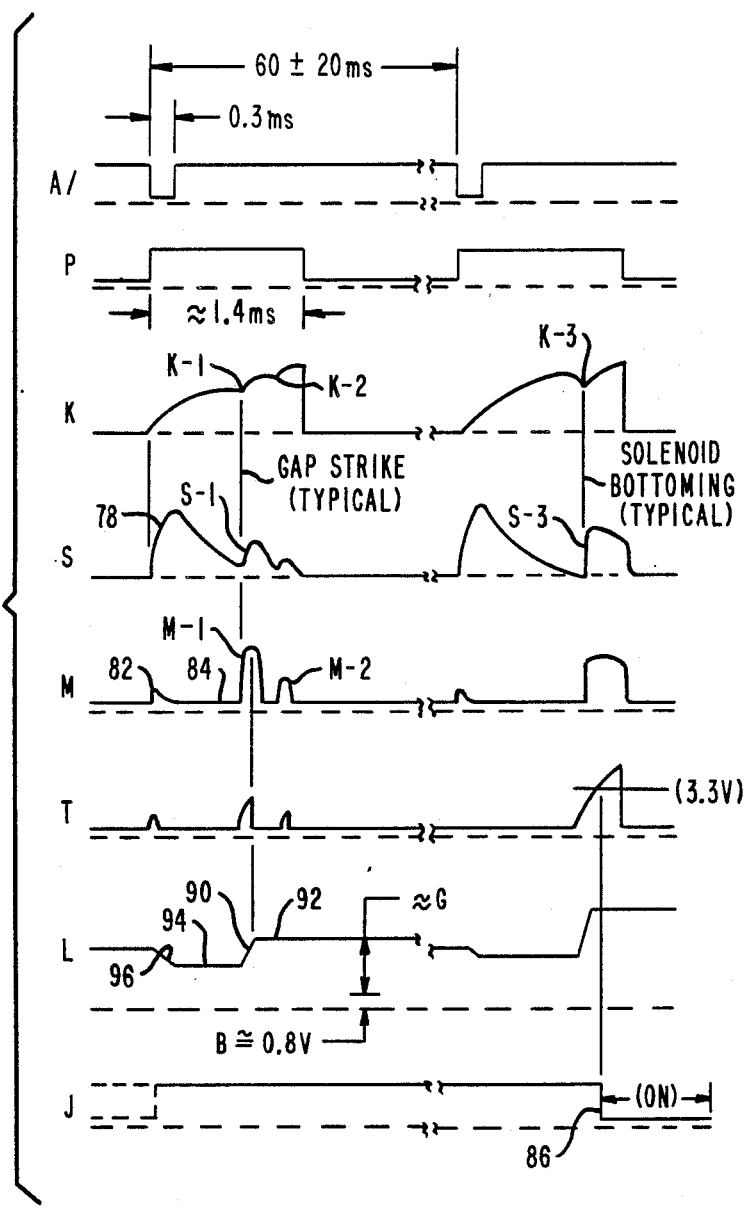
FIG. 6 shows certain waveforms associated with the circuit shown in FIGS. 5A and 5B.

Before describing the details of the circuit 34 shown generally in FIG. 3 and shown in more detail in FIGS. 5A and 5B, it is useful to continue to describe how the circuit 34 operates, generally. In this regard, the waveforms shown in FIG. 6 are useful in describing the operation of the circuit 34.

The displacement of the moveable member (solenoid plunger 38 shown in FIG. 3) of the electromagnetic device (print solenoid 39 shown in FIG. 3) is obtained by first placing the associated operating coil (coil 50 in FIG. 3) in series with circuit 34 as shown in FIG. 5A. Naturally, certain parameters have to be established for the particular application being tested. For the embodiment described, the constant voltage source for the coil 50 is 15 volts and the energizing period for the coil 50 is approximately 1.4 milliseconds as shown by waveform P in FIG. 6. It is during this time period (1.4 milliseconds) that the perturbations in the energizing current are detected and examined. Waveform K in FIG. 6 shows the perturbations K-1 and K-2 which occur during the time period mentioned. In the embodiment described, it is the first perturbation K-1 which is utilized as being indicative of the gap (platen gp 36 in FIG. 3) being measured.

A feature of this invention is that a first derivative signal is generated from the waveform K (FIG. 6) which shows the perturbations K-1 and K-2. The first derivative signal is shown as waveform S in FIG. 6, and it represents a change in current with respect to time, i.e. $di/dt$. Notice that the current increases rapidly at perturbation K-1 and correspondingly, the waveform S has an indicator portion at S-1 which corresponds to the perturbation K-1. It is this first indicator portion S-1 (which corresponds to perturbation K-1) which is selected as representing the platen gap 36 (FIG. 3). The signal S-1 is then referenced and amplified as will be later described herein to produce the waveform M in FIG. 5. The referenced portion M-1 of waveform M corresponds to the perturbation K-1 and has a height which corresponds to the displacement or measurement of the solenoid plunger 38 (FIG. 3) in the example being described. The circuit 34 has additional features to be later described herein; however, it seems appropriate to discuss these features when the associated details of the circuit 34 are discussed. Naturally, the height of the indicator portion M-1 is converted to values which can be coupled to the "go-no-go" indicator lights 60 and 62 to give an indication of the displacement being measured, or the values can be coupled to a voltmeter 74 (FIG. 3) to give a quantitative or analog indication of the displacement.

Having described, generally, the operation of the circuit 34, it appears appropriate to discuss the details of the circuit 34 shown in FIGS. 5A and 5B. Where pertinent, the values of the components have been placed on FIGS. 5A and 5B directly; consequently, the values of the components will not be discussed in this description except where such values are important to an understanding of this invention.

As alluded to earlier herein, it is necessary to establish certain parameters for the electromagnetic devices being tested. In the embodiment described, the print solenoid 39 (FIG. 3) requires a constant voltage of 15 volts to energize it, and an energizing duration of 1.4 milliseconds is utilized.

The circuit 34 (FIGS. 5A and 5B) can best be described by starting with the development of the blanking pulse A/ (read as "A Bar") shown in FIG. 6. Referring to the upper left hand corner of FIG. 5A, the resistors R1, R2, and R3 and the capacitor C1 are conventionally combined with a conventional multivibrator circuit U1 to produce the blanking pulse A/ at the output O of circuit U1. The circuit U1 is a standard multivibrator circuit like integrated circuit NE556, or the equivalent, which is available from a variety of manufacturers including Signetics Corporation, for example. The A/ signal is active (low) for 0.3 milliseconds, as shown in FIG. 6, and it is repeated every 60 milliseconds, ±20 milliseconds. The A/ or blanking pulse is fed into the triggering input $T_r$ of the circuit U2. The circuit U2 is identical to circuit U1 and represents ½ of an integrated circuit package which also includes circuit U1. The resistors R3-1, R4, and R5, and the capacitor C2 are conventionally coupled to the circuit U2 as shown in FIG. 5A to produce the P waveform shown in FIG. 6. The P waveform is initiated by the A/ signal and has a duration of approximately 1.4 milliseconds which represents the energizing period for the particular coil 50 (FIG. 3) to be energized. The duration of 1.4 milliseconds is long enough to insure that the widest possible gap associated with platen gap 36 (FIG. 3) will be covered. Making the duration of the P waveform longer than necessary just keeps the coil 50 energized too long and thereby produces unnecessary heat. The capacitor C2, which is also designated as (PP) in FIG. 5A, is a polypropylene type which is more stable than ceramic capacitors, for example.

The P waveform (FIG. 6) just described as coming from the output O of the circuit U2 (FIG. 5A) is fed into an inverter U3 and is re-inverted by inverter U4 to establish a positive bias on the base of transistor Q1 through the resistor R6. It should be recalled that the period P of approximately 1.4 milliseconds represents the period during which the energizing current to the coil 50 (FIG. 3) of the print solenoid 39 is sampled or examined for perturbations.

The transistor Q1 used is an electronic switch to supply energizing current to the coil 50 in the example being described. As previously stated, the energizing coil 50 is placed in series with the source of potential of +15 volts and the circuit 34 by having one end of the coil connected to the +15 volts and the remaining end of the coil 50 connected to the collector of the transistor Q1. The transistor Q1 is a Darlington power transistor, like transistor circuit 2N6388, for example, which is driven to a "full-on" state when the positive bias from the P waveform is placed on its base. The emitter of the transistor Q1 is connected to ground through a series-connected resistor R7, to complete an energizing path for coil 50 when the transistor Q1 conducts. A diode D1 is placed in parallel with the leads of the coil 50. Diode D1 is a "flyback" diode which is conventionally used to protect the transistor Q1 when transistor Q1 is switched off.

When the coil 50 is energized, the associated operating plunger 38 (FIG. 3) moves outwardly to contact the platen 40 to thereby provide the perturbations which are used in determining the setting of the platen gap 36. The perturbations exist in the waveform K (FIG. 6) already alluded to earlier herein. Waveform K is obtained from point K (connected to the emitter of Q1) in FIG. 5A, with point K being placed in a small circle in FIG. 5A. If point K in FIG. 5A were fed into an oscilloscope, the waveform K in FIG. 6 is approximately what would be displayed on the associated display screen. The diode D2, also connected to the emitter of transistor Q1, has its cathode connected to the input of capacitor C2. The function of diode D2 is purely protective in that it protects the circuit 34 from damage due to the possible shorting of coil 50. If coil 50 were shorted, the voltage across resistor R7 would attempt to get up to 15 volts in the example described. The diode D2 feeds the voltage developed across resistor R7 to the capacitor C2. In the normal situation, the capacitor C2 is gradually charged until it reaches a level of about 3.3 volts in about 1.3 or 1.4 milliseconds as described earlier herein, and this voltage is used as a trigger voltage by the circuit U2 to shut off the circuit U2, thereby establishing the duration of waveform P at 1.4 milliseconds. If a short occurs in coil 50, the voltage passing through diode D2 causes the voltage across capacitor C2 to rise to approximately 3.3 volts in a few microseconds, thereby triggering circuit U2 into an off condition to terminate the P waveform and thereby shut off transistor Q1.

Continuing with the description of circuit 34 (FIGS. 5A and 5B), the waveform K (FIG. 5A) is fed to a capacitor C3 which is a polypropylene (PP) capacitor which is used for stability. It is critical that the capacitor C3 be stable because the gap measurement accuracy is directly proportional to the parameter stability of the capacitor C3. The capacitor C3, the resistor R8, and the operational amplifier circuit U6 are utilized to provide a means for generating the first derivative signal already alluded to in relation to waveform S discussed in relation to FIG. 6. Circuit U6 is a conventional operational amplifier such as circuit LM324 which is manufactured by Signetics Corporation, for example. The capacitor C3 and the resistor R8 combine to put the same signal as waveform K into the positive (+) input of op amplifier U6. The diode D3, whose anode is connected to a node B and whose cathode is connected to the positive (+) input of op amp U6, is used as a protective element. Diode D3 prevents the positive input of op amplifier U6 from going lower than ground. As seen from FIG. 5B, node B is at a voltage level which is just one diode drop or approximately 0.84 volts above ground through the use of resistor R9 and diode D4 being series connected between ground and a positive potential of ±5 volts. The junction between diode D4 and resistor R9 represents node B throughout FIGS. 5A and 5B.

The op amplifier U6 (FIG. 5A) recreates the signal that it receives on its positive terminal; however, it magnifies it; this is the signal between the capacitor C3 and the resistor R8. The output of the op amplifier U6 is referred to as a first derivative signal or S waveform as shown in FIG. 6; the letter S within a circle on FIG. 5A points to where the S waveform originates. The resistors R10 and R11 are simply the gain setting resistors associated with the op amplifier U6. The resistor R12, connected to the output of the op amplifier U6 and the capacitor C4, is simply a current-limiting resistor.

From the output side of the bipolar, polypropylene capacitor C4 (node 76 in FIG. 5B), the circuit 34 splits into two different paths for two different purposes. The first path leads to the diode D5 and the NPN transistor Q2. The second path is again split going to the negative (−) input of op amplifier U7 and the positive (+) input of the op amplifier U11. This second path to the op amplifiers U7 and U11 has no effect on the capacitor C4; however, the voltage which is developed across the capacitor C4 will try to follow the S waveform. In this regard, notice that there is a very large "hump" 78 (FIG. 6) in the S waveform which occurs when the energizing pulse to the coil 50 is first turned on. This hump 78 is of no interest to us, and it should be blanked, otherwise it will swamp the circuit 54, causing an erroneous reading.

The blanking of the hump 78 in the S waveform is effected by using the A/ signal and the P waveform. Notice from FIG. 6 that when A/ is active and the P waveform is active, there is a 0.3 millisecond period which can be utilized to blank the hump 78 in the S waveform. To obtain a signal corresponding to this 0.3 millisecond period, a voltage divider network (FIG. 5A) including resistors R13 and R14 is used. The A/ signal is inverted through the inverter U5 and is connected to one end of resistor R13. The P waveform is inverted by the inverter U3 and is fed into one end of resistor R14. When the A/ waveform is active (low) and the P waveform is active (high), the side of resistor R14 which is connected to inverter U3 effectively falls to ground level, and the side of resistor R13 which is connected to inverter U5 is at a positive potential, producing a positive level at the node 80 between the resistors R13 and R14. In effect, the portion of the circuit 34 just described produces an ANDing function to place a positive bias on the base of transistor Q2 (FIG. 5B). At the time that transistor Q2 conducts, the output of op amplifier U7 is already going in a negative direction; this is because the op amplifier U7 is connected in the "invert" mode and the S waveform is increasing at this time. When the transistor Q2 conducts, it pulls the left plate (as viewed in FIG. 5A) of capacitor C4 down (towards the negative) and holds it down for the duration of the active portion (0.3 milliseconds) of the A/ waveform.

Next, consider the M waveform (FIG. 6) which is derived from the S waveform. The M waveform represents the output of the op amplifier U11 which receives the output of the capacitor C4, with the amplifier U11 being used in the "normal" mode. As FIG. 5B also begins to increase as shown by line 82 in FIG. 6. But shortly after the slight increase along line 82, transistor Q2 conducts, as previously described, to lower the voltage level on the left plate of capacitor C4. After the end of the A/ period, the transistor Q2 is shut off; however, at this time, the S waveform is now falling in voltage (from hump 78 to indicator portion S1) so the voltage on the left plate of capacitor C4 does not increase but stays rather constant as shown by line 84 on the M waveform which is due to the output of U7 holding the voltage at the negative terminal thereof equal to the voltage at the positive terminal thereof by forcing capacitor C4 discharge current through diode D5. When the S waveform begins to rise again due to indicator portion S-1 rising, the voltage level on capacitor C4 rises, and consequently, now that the transistor Q2 conductor/blanking pulse (A1) is inactive, the output of op amplifier U11 or the M waveform begins to rise as shown by M-1 in FIG. 6. The portion M-1 corresponds to the indicator portion S-1; however, portion M-1 is amplified by an amplification factor of two due to the gain resistors R15 and R16 associated with the op amplifier U11.

At this point, it is useful to consider the operations within the circuit 34 when a "bottoming out" of the print solenoid 39 occurs. In this regard, the perturbation K-3 in the K waveform in FIG. 6 represents such a "bottoming out" as previously discussed. From the S waveform, the indicator portion S-3 corresponds to the perturbation K-3. The S waveform is reflected at the left plate of capacitor C4 as previously described, and this left plate is fed into the positive (+) input of an op amplifier U8 (FIG. 5B) which provides a gain of about 23 via the associated gain-setting resistors R17 and R18. The output of the op amplifier U8 is fed through two resistors R19 and R20 which are connected as shown in FIG. 5B to charge the bipolar, polypropylene (PP) capacitor C5. Resistor 19-1 is used as a pull-up resistor. One of the characteristics of an indicator portion of a bottoming out perturbation, like K3, is that the indicator portion S-3 is a significant pulse which stays on for a longer time than does an indicator portion like S-1 resulting from a typical measuring perturbation, like K-1. When S-3 stays on longer than S-1, for example, the op amplifier U8 (FIG. 5B) charges the capacitor C5 towards a level above 3.3 volts in the embodiment described. When the T waveform (FIG. 6) reaches a level of 3.3 volts, it triggers the one-shot timer U9, causing its output O to fall to a low level as shown by line 86 in FIG. 6. The T waveform is obtained from the circuit 34 at the point marked T which is enclosed in a circle in FIG. 5B. A low level at output O of timer U9 causes a light-emitting diode LED, connected between the +5 volts and the resistor 21 (which in turn is connected to the output O of the timer U9), to light up. When the LED lights up, it gives an indication, as at indicator 64 in FIG. 3, that the solenoid plunger 38 has bottomed out as previously described. The waveform for showing the status of the LED is referred to as the J waveform in FIG. 6, and the J waveform is obtained from the circuit 34 at the point marked J which is enclosed in a circle in FIG. 5B.

Diode D6 immediately discharges Capacitor C5 to prevent an accumulated build up of voltage on capacitor C5 caused by repetitive and legitimate "M" pulses. This voltage could build up to the 3.2 volts trigger level and give a false "bottom" indication. The LED is reset to the off condition by a trigger pulse on "TR" of U9 which is the A/ signal.

By keeping the negative terminal input equal to the positive (+) input to op amplifier U7 at a constant 0.84 volts at this time, a quiescent level at line 84 for the M waveform is established. When the S waveform starts to rise again after a quiescent level, the transistor Q2 will have been shut off due to the A/ pulse having transpired, and consequently, the voltage level at capacitor C4 will follow the S waveform but at an offset therefrom due to the previously charged capacitor C4 (FIG. 5A).

As stated earlier herein one leg of the second path from the capacitor C4 leads to the op amplifier U11 (FIG. 5B) whose output is the M waveform shown in FIG. 6. The op amplifier U11 is used substantially as a standard amplifier with resistors R15 and R16 providing a gain of two, and with resistor R16 being coupled to the reference voltage (node B) of 0.84 volts. There are two paths emanating from the output M of op amplifier U11. The first path leads upwardly through diode D7, and the second path leads downwardly (as viewed in FIG. 5B) through the diode D8. The resistor R22 and capacitor C6, which are series connected between the cathode of diode D7 and ground, are used for "snubbing" or for preventing a ringing oscillation in the circuit 34. The resistor R22 and the capacitor C6 also provide a fairly significant load when the M waveform increases suddenly as it does. The portion of the circuit coupled to the cathode of diode D8 mirrors, to a degree, the portion of the circuit which is coupled to the cathode of diode D7; however, the gain setting resistors R15 and R16 associated with the op amplifier U11 from a design standpoint, were not wanted across the signal voltage holding capacitor C7. Point L, shown within a circle in FIG. 5B, has a signal corresponding to the L waveform shown in FIG. 6. The snubbing action of capacitor C6 and resistor R22 is done to introduce stability with regard to the operation of op amplifier U11; in other words, the op amplifier U11 will not get saturated and "fly" up to 5 volts with the arrangement shown. This stability of operation of the op amplifier U11 is important because the peak voltage of output M of this amplifier is used as a measure of the displacement of the moveable member or solenoid plunger 38 in the embodiment described.

The L waveform is important as far as the output of the circuit 34 is concerned. Notice from FIG. 6 that when a pulse like M-1 on the M waveform begins to rise, a corresponding rise portion at line 90 on the L waveform occurs. Also, the level at line 92 of the L waveform corresponds to the peak M-1 associated with the M waveform. Essentially, it is the highest peak, like M-1, within a sampling period of 60 milliseconds which is used for obtaining the level of displacement (line 92 on the L waveform) within the sampling period. The lesser peaks occurring in the M waveform are disregarded.

When looking at FIG. 5B, it is apparent that the L waveform is determined from the voltage across capacitor C7. It follows, then, that the only time that the voltage across capacitor C7 can be affected by the output of the op amplifier U11 occurs when the diode D8 is conducting. While the voltage across capacitor C7 will decay with the passage of time, it would be useful to have the L waveform actively brought down to a lower level, as at line 94 in FIG. 6, so as to be able to detect a rise as at line 90. This reducing of the L waveform near the start of a sampling period would avoid the erroneous condition of the circuit 34 giving an indication that the displacement of a gap being measured is staying "wide" when it is actually known to be getting smaller.

To effect reducing the L waveform at the start of a sampling period to the level 94 shown in FIG. 6, for example, the blanking pulse A/ is used. Notice from FIG. 5B that the positive terminal of the capacitor C7 is connected to one end of a resistor R23-1 whose remaining end is connected to the anode of a diode D9, with the cathode of the diode D9 being connected to the A/ pulse. The A/ pulse becomes active (low) at the start of a sampling period, as shown in FIG. 6, and consequently, some of the charge on the capacitor C7 will be bled off during the 0.3 milliseconds when the A/ pulse is active or low. The level 94 of the L waveform is generally established so that it is lower than any possible displacement of a moveable member within the 0.3 millisecond interval. Also, the smaller peaks, like M-2 on the M waveform, have no effect on the level 92 of the L waveform. In one sense, the circuitry associated with the diode D8 and the capacitor C7 functions as a "sample and hold" circuit.

The remaining part of the circuit 34, which is located to the left of the positive terminal of capacitor C7 as viewed in FIG. 5B, is essentially a low-pass filter circuit. The output from the capacitor C7 passes through a resistor R23 to a low-pass filter circuit including resistors R23, R24, R25, and R26, capacitors C8 and C9, and the op amplifier U10. In effect, the low pass filter circuit follows a slow-going signal, but not a fast-going one. In other words, when looking at the L waveform, one would not see the changes produced by slopes 96 and 90, for example; these would be ignored. The output of the op amplifier U10 is fed into one end of a variable resistor R27 whose remaining end is coupled to ground through a diode D10.

The variable resistor R27 (FIG. 5B) is used to provide a reading from the output of circuit 34. In this regard, the moveable arm of the variable resistor R27 could be connected to a scale which shows physical distance as measured between G+ and G−. The actual physical scale is shown in FIG. 5B; however, in the embodiment described, one volt is equal to 0.010 inches. Naturally, other values could be used depending upon particular applications. In effect, the highest of the peaks like M-1 for the M waveform (FIG. 6) are being converted to a voltage by the circuit 34. The diode D10 (FIG. 5B) is used to offset the logic ground from actual ground by about 0.84 volts; this permits a linear representation of the gap being measured.

In normal use, the print solenoid 39 (FIG. 3) is repeatedly fired in a 60 millisecond cycle time in the embodiment described so as to give the illusion of continuous measurement to an operator using the circuit 34. From what has been described, it is apparent that an indicator portion like S-1 in the S waveform which corresponds to a perturbation like K1 in the K waveform is converted to a value like M-1 in the M waveform, which value corresponds to the displacement of a moveable member, like the solenoid plunger 38 (FIG. 3).

A feature of this invention is that the circuit 34 may be used to measure the movement of a moveable member of an electromagnetic device when the electromagnetic device is inaccessible or when the electromagnetic device is placed in an environment which may be harmful to a human attempting to use feeler gages.

Figure 7:
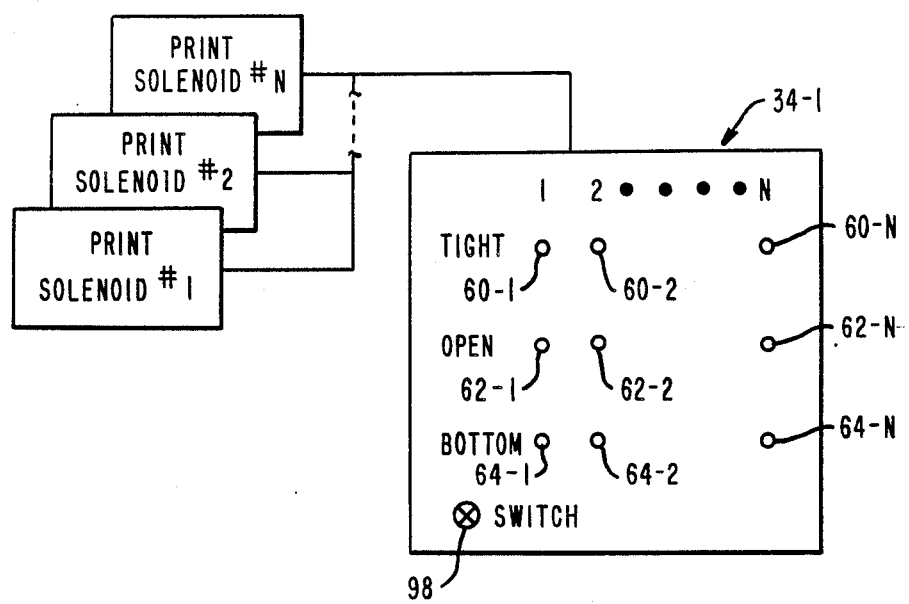
FIG. 7 is a schematic diagram, in block form, of an embodiment of this invention which may be used to set the gaps of a plurality of electromechanical devices.

While the circuit 34 (FIG. 3) has been described relative to a single electromagnetic device like the print solenoid 39, the circuit 34 can be duplicated to provide for the setting of gaps on a plurality of electromagnetic devices. For example, a plurality of print solenoids like print solenoid #1 through #N shown in FIG. 7 may be coupled to a testing apparatus 34-1 which includes a plurality of circuits 34 shown in FIG. 3. Each electromagnetic device or print solenoid #1 through #N would have its own circuit 34 and indicator lights. For example, the gap for print solenoid #1 would be set using the "tight" or "no-go" indicator 60-1, the loose or "open" indicator 62-1, and the bottoming out or "bottom" indicator 64-1 as described in relation to FIG. 3. The gap for print solenoid #2 would be set using the corresponding indicator lights 60-2, 62-2, and 64-2. And finally, the last electromagnetic device would be set using the indicators 60-N, 62-N, and 64-N. A switch 98 would be used to energize the devices being tested. An advantage of testing several electromagnetic devices like the print solenoids shown in FIG. 7 is that a whole line may be viewed at once. This enables the operator doing the testing to check for curved or tilted platens (not shown) associated with the print solenoids or for skewed gaps while cycling the print head (made up of a plurality of print solenoids) during the testing or measuring process.

Figure 8:
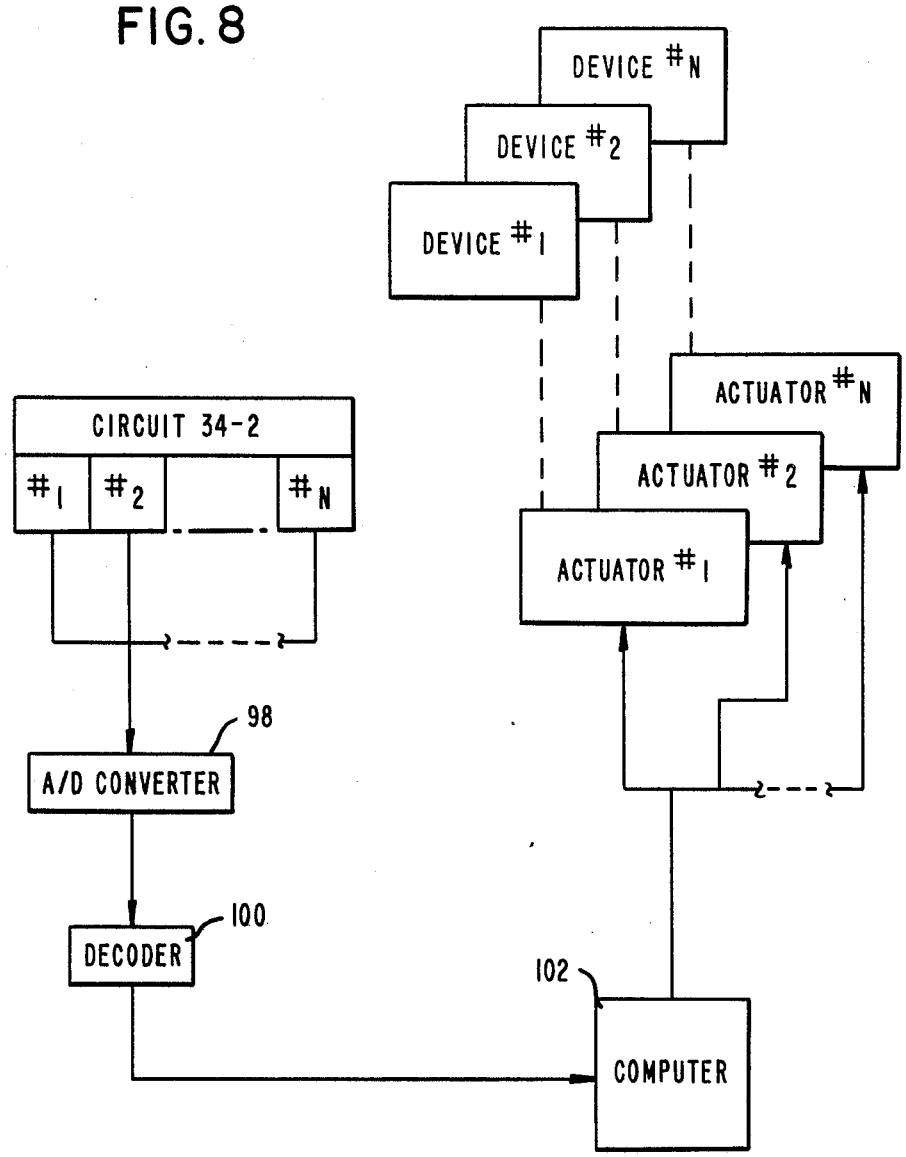
FIG. 8 shows another embodiment in which the circuit may be used.

FIG. 8 shows another embodiment in which the circuit of this invention may be used. The circuit designated as 34-2 is identical to the circuit 34 shown in FIGS. 5A and 5B except that the circuit 34-2 has a separate circuit like 34 for each electromagnetic device like #1, #2 up to #N to be tested. The outputs for the separate circuits come from the op amplifiers U10 in FIG. 5B, for each of the associated electromagnetic devices like #1, #2, up to #N. The outputs from the separate circuits of circuit 34-2 are routed through an analog/digital (A/D) converter 99 to place the data into digital form. A decoder 100 is then used to decode the data for use by the computer 102. The data from the decoder 100 may be stored in the memory (not shown) of the computer 102 for subsequent use, or it may be used as part of a dynamic testing operation. For example, the actual gaps between the solenoid plungers (like plunger 38 in FIG. 3) and the associated platen may be determined while the printer is being run. Measuring the gaps in real time in this manner is invaluable in diagnosing mechanical printer problems such as loose bearings or cam binds.

In some situations, the computer 102 could issue a correcting signal to form a closed loop system back to the electromagnetic devices so as to adjust their displacements, if necessary. In this regard, a conventional actuator may be provided for each electromechanical device to adjust the gap in accordance with the feedback from the circuit 34-2 shown in FIG. 8. For example, actuator #1 is used to adjust electromechanical device #1, actuator #2 is used for device #2, and actuator #N is used for device #N. Because the specific actuators, like #1, are not important to an understanding of this invention, they are shown only schematically.

While setting gaps for electromagnetic devices provides an important use of this invention, another feature of this invention is that it can be used in testing center-to-center distances between adjacent devices. In this regard, it is important that accurate, center-to-center distances be established between the print wires or plungers of print solenoids used in wire matrix printers, for example. Very often, the mounting holes in which print solenoids are to be mounted are accurately located; however, the holes may be slightly oversized, resulting in some looseness or play between the print solenoid and the hole. Also, the wire plunger may not be concentrically located within the print solenoid itself, causing the wire plungers of the print solenoids to have inaccurate, center-to-center distances.

Figure 9:
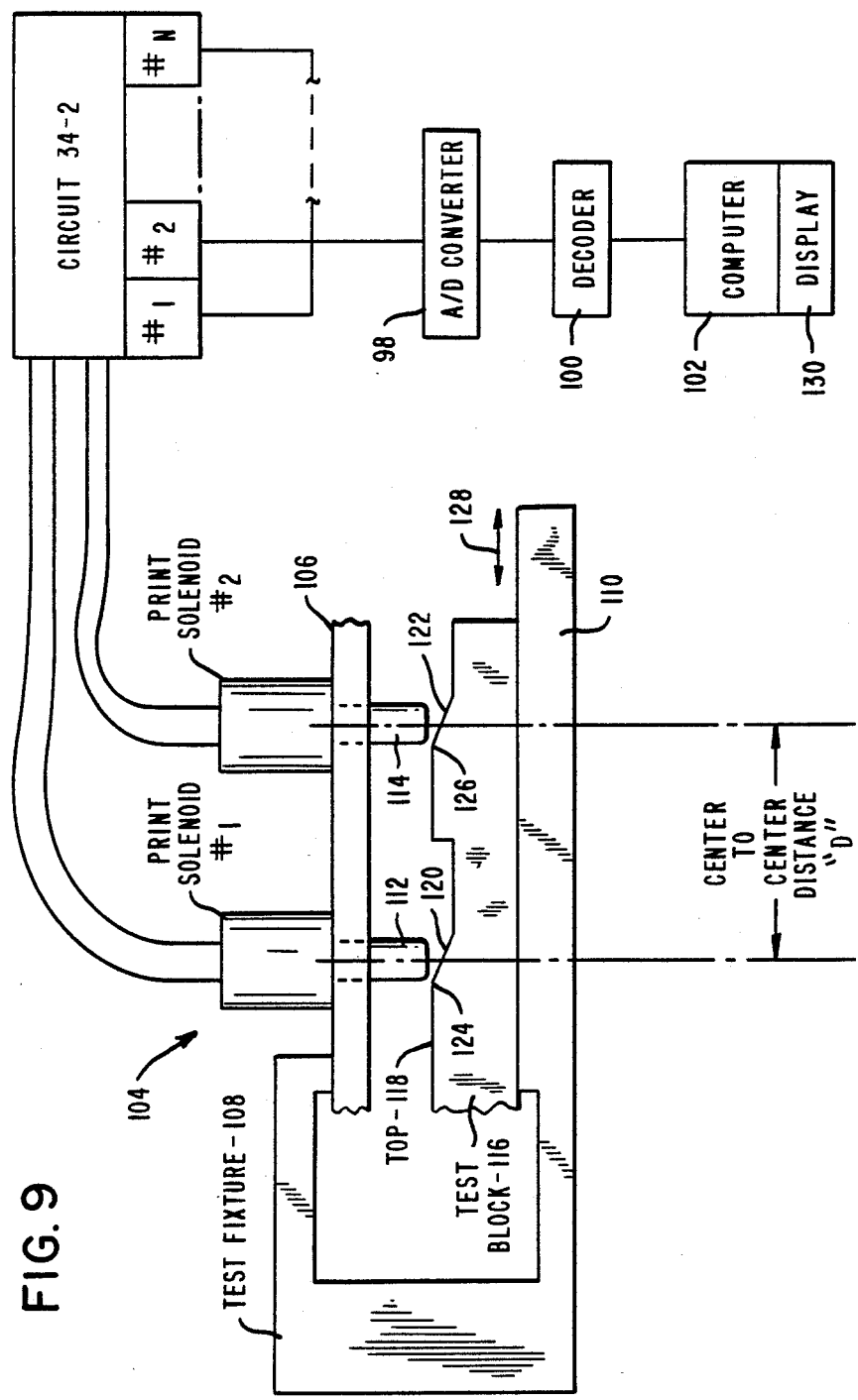
FIG. 9 is a diagrammatic view of a center-to-center testing device in which the circuit of this invention may be used.

The apparatus 104 shown in FIG. 9 is useful in overcoming the problems cited in the previous paragraph. In the example depicted, the print solenoids #1 and #2 are mounted on a mounting plate or carriage 106 which may be mounted in a printer (not shown) after the testing is finished. The actual configuration of the printer with regard to the number of print solenoids used and their general arrangement is not important to an understanding of this invention other than to state that print solenoids #1 and #2, for example, are spaced apart a center-to-center distance D which may be one inch, for example.

The apparatus 104 includes a conventional test fixture 108 which is shown only schematically in FIG. 9. The test fixture 108 includes a planar surface 110 with conventional means for detachably mounting the mounting plate 106 parallel to and spaced from the planar surface 110. The print solenoids #1 and #2 are detachably mounted in the carriage or mounting plate 106, and it is the center-to-center distance between the longitudinal axes of the wire plungers 112 and 114 which is to be tested. The apparatus 104 also includes a test block 116 having the cross-sectional shape shown.

The test block 116 (FIG. 9) has a top planar surface 118 and angled or bevel planar surfaces 120 and 122. The junction (shown as 124) between the top planar surface 118 and the bevel planar surface 120 and the junction (shown as 126) between the top planar surface 118 and the bevel planar surface 122 are spaced apart one inch in the embodiment described to match the center-to-center distance between the wire plungers 112 and 114 given as an example. While the distance between junctions 124 and 126 is the same as the center-to-center distance mentioned, it doesn't have to be so; making these two distances equal simplifies the calculations to be later described herein. The test block 116 is reciprocatingly movable along a line indicated by double arrows 128. When the print solenoid #1 and #2 are mounted as shown in FIG. 9, the longitudinal axes of the wire plungers 112 and 114 are perpendicular to the top planar surface 110, and the test block 116, when used, is moved along a line which is included in or parallel to an imaginary plane which includes the longitudinal axes of wire plungers 112 and 114.

The apparatus 104 (FIG. 9) also includes the circuit 34-2, the A/D converter 98, the decoder 100, and the computer 102 which are coupled together as shown in FIG. 9 and as already discussed in relation to FIG. 8. The computer 102 also has a display 130 for displaying the output of the apparatus 104.

The apparatus 104 (FIG. 9) is used as follows. Assume that print solenoids #1 and #2 are mounted on the mounting plate 106 and that the mounting plate 106 is installed in the test fixture 108. The print solenoids #1 and #2 are connected to the circuit 34-2 as already explained, and the testing is ready to begin.

Several gap readings are obtained as part of the test procedure using the apparatus 104 shown in FIG. 9. The first gap reading is obtained by taking a gap reading of print solenoid #1 and a gap reading of print solenoid #2 when the wire plungers 112 and 114 impact against the top planar surface 118 of the test block 116; these readings are (GT) for solenoid #1 and (GT) for solenoid #2. Thereafter, the test block 116 is moved slightly to the left (as viewed in FIG. 9) to bring the bevel planar surfaces 120 and 122 in alignment with the wire plungers 112 and 114, respectively as shown. Second gap readings are taken for print solenoids #1 and #2 and these readings are designated ($G_B$) for solenoid #1 and ($G_B$) for solenoid #2. These readings are determined by the circuit 34-2 as previously described, and the readings are stored in the RAM (not shown) of the computer 102. The readings obtained are then withdrawn from the RAM, and a calculation is performed by the computer 102 according to the following equation:

$$C = k \left[ (G_B - G_T)\#1 - (G_B - G_T)\#2 \right].$$

Figure 10:
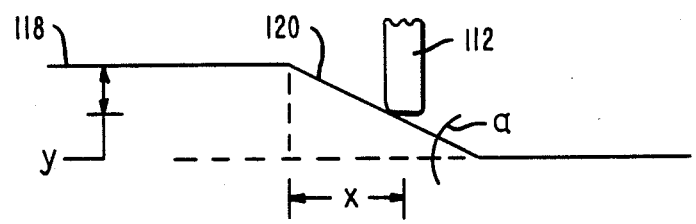
FIG. 10 shows a test block used in a preferred embodiment to determine gap distances.

The expression $(G_B - G_T)\#1$ can be read as "The gap distance to level planar surface 120 minus the gap distance to the top planar surface 118 for print solenoid #1"; the corresponding expression $(G_B - G_T)\#2$ "k"in the equation is a factor which is determined by the trigonometry of the test block 116. For example, for a certain value for $(G_B - G_T)$ which is the equivalent "y" distance shown in FIG. 10, there is an "x" distance depending upon the angle "a". Ideally, if the wire plungers 112 and 114 are located exactly one inch apart in the example described, the $(G_B - G_T)$ expression becomes zero for print solenoid #1 and for print solenoid #2, making "C", the resultant, equal to zero. The values described can be displayed on the display 130, and a keyboard (not shown) associated with the computer 102 is used for initiating the test. Conventional software is used by the computer 102 for handling the transaction described. In the example being described, the center-to-center distance between the wire plungers 112 and 114, i.e., the "x" distances (derived as explained with regard to FIG. 10), may be used to give an indication as to "how much", for example, the center-to-center distance varies. If the variation is outside of accepted limits established for a particular application, the print solenoids #1 and #2 may be replaced, or the whole assembly comprising the carriage or mounting plate 106 and the print solenoids #1 and #2 may be rejected.

What is claimed is:

1. An apparatus for measuring the centerline-to-centerline distance between first and second moveable members of first and second electromagnetic devices, respectively, comprising:

a mounting support for mounting said first and second movable members thereon to establish a centerline-to-centerline distance between said first and second moveable members;

support means having a planar surface and also having means for supporting said mounting support so that the centerlines of said first and second moveable members are perpendicular to said planar surface;

a test block having a top surface and a bottom surface which are parallel to each other, said top surface having first and second bevel surfaces which are parallel to each other, spaced apart at a predetermined distance and extend from said top surface towards said bottom surface; and a circuit coupled to said first and second electromagnetic devices for measuring the displacement of said first and second moveable members when the associated first and second electromagnetic devices are energized;

said circuit giving a first indication of the displacement of said first and second moveable members when the top surface of said test block is positioned in said support means to enable said first and second members to impact against said top surface when said first and second electromagnetic devices are energized, and said circuit also giving a second indication of the displacement of said first and second moveable members when said test block is moved in said support means to enable said first and second members to impact against first and second bevel surfaces, respectively, when said first and second electromagnetic devices are energized, with the difference in displacement of said first moveable member from said first and second indications and with the difference in displacement of said second moveable member from said first and second indication being used as a measure of said centerline-to-centerline distance.

2. The apparatus as claimed in claim 1 in which said circuit comprises first and second circuits for said first and second electromagnetic devices, respectively, with said first and second circuits being identical to each other;

said first and second electromagnetic devices having first and second operating coils, respectively, with said first and second operating coils having perturbations in their energizing currents when the associated first and second electromagnetic devices are energized during a measurement of the displacements of said first and second moveable members;

said first circuit comprising:

detector means for detecting said perturbations in said energizing current of said first operating coil;

generating means for generating a first derivative signal of said energizing current of said first electromagnetic device;

said first derivative signal having indicator portions corresponding to said energizing current of said first operating coil;

selecting means for selecting one of said indicator portions of said first derivative signal being indicative of said displacement of said first moveable member; and converting means for converting said one of said indicator portions into a value corresponding to the displacement of said first moveable member.

3. The apparatus as claimed in claim 1 in which said first and second electromagnetic devices are first and second print solenoids and said first and second moveable members are first and second print wires, respectively, of said first and second print solenoids.

* * * * *